(12) United States Patent
Waltermann et al.

(10) Patent No.: US 9,829,325 B2
(45) Date of Patent: Nov. 28, 2017

(54) DISABLEMENT OF GLOBAL POSITIONING SYSTEM TRANSCEIVER WHILE PROVIDING DIRECTIONS

(71) Applicant: Lenovo (Singapore) Pte. Ltd., New Tech Park (SG)

(72) Inventors: Rod D. Waltermann, Rougemont, NC (US); Russell Speight VanBlon, Raleigh, NC (US); Nathan J. Peterson, Oxford, NC (US); Arnold S. Weksler, Raleigh, NC (US); John Carl Mese, Cary, NC (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 103 days.

(21) Appl. No.: 14/962,410

(22) Filed: Dec. 8, 2015

(65) Prior Publication Data

US 2017/0160090 A1    Jun. 8, 2017

(51) Int. Cl.
```
G06F 19/00    (2011.01)
G01C 21/34    (2006.01)
G01S 19/34    (2010.01)
G01S 19/49    (2010.01)
```
(52) U.S. Cl.
CPC .............. *G01C 21/34* (2013.01); *G01S 19/34* (2013.01); *G01S 19/49* (2013.01)

(58) Field of Classification Search
CPC ........ G01C 21/34; G01C 21/00; G01C 21/26; G01S 19/42; G01S 1/00; G06K 7/10; G08B 1/08; G08B 13/14; H04W 12/00; H04W 12/04; H04W 12/06; H04L 9/08

USPC .......................................... 345/156; 701/468
See application file for complete search history.

(56) References Cited

U.S. PATENT DOCUMENTS

2006/0164230 A1* 7/2006 DeWind ................ B60K 35/00
                                                    340/461
2014/0365965 A1* 12/2014 Bray ..................... G06T 11/001
                                                    715/810

OTHER PUBLICATIONS

Jonathan Gaither Knox, "Systems and Methods to Vary Rate of Communication Between GPS Transceiver and at Least One Satellite for Outputting Directions", file history of related U.S. Appl. No. 15/655,621, filed Jul. 20, 2017.

* cited by examiner

*Primary Examiner* — Ronnie Mancho
(74) *Attorney, Agent, or Firm* — John L. Rogitz; John M. Rogitz

(57) ABSTRACT

In one aspect, a device includes a processor, a motion sensor accessible to the processor, a global positioning system (GPS) transceiver accessible to the processor, and storage accessible to the processor. The storage bears instructions executable by the processor to identify at least a first instruction to travel to a location, and determine whether to disable the GPS transceiver based at least in part on one or more of a distance to be traveled before a second instruction is provided and a length of time to pass before the second instruction is provided. The instructions are also executable by the processor to monitor motion of the device based on input from the motion sensor responsive to disabling the GPS receiver.

20 Claims, 5 Drawing Sheets

DISABLEMENT OF GLOBAL POSITIONING SYSTEM TRANSCEIVER WHILE PROVIDING DIRECTIONS

FIELD

The present application relates generally to disablement of a global positioning system (GPS) transceiver on a device while providing directions.

BACKGROUND

When, employing a GPS transceiver on a device to provide directions, often times the GPS transceiver drains an undesirable amount of power over time from the device's battery. Some users attempt to save battery power by manually turning off the device's display, which is often illuminated while the device is providing directions. However, when such a device's display is turned off by the user, this often causes the device to disable the device's GPS transceiver as well and render the device unable to continue providing directions. What's more, when the user illuminates the display again and the GPS transceiver is re-enabled, it often takes an undesirable amount of time for the device to re-sync itself for continuing to provide directions.

SUMMARY

Accordingly, in one aspect a device includes a processor, a global positioning system (GPS) transceiver accessible to the processor, a motion sensor accessible to the processor, and storage accessible to the processor. The storage bears instructions executable by the processor to receive user input to identify a route to a location based at least in part on input from the GPS transceiver, disable the GPS transceiver, and track travel progress along the route based at least in part on input from the motion sensor at least until one or more of a threshold time before conclusion of a first amount of time that is to pass before an instruction to travel to the location is to be provided, and a threshold position before an end point of a first distance that is to be traveled before the instruction is to be provided In another aspect, a method includes identifying, using a device, at least a first instruction to travel to a location and determining whether to disable a global positioning system (GPS) transceiver on the device based at least in part on one or more of a distance to be traveled before a second instruction is provided and a length of time to pass before the second instruction is provided.

In still another aspect, an apparatus includes a first processor, a network adapter, and storage bearing instructions executable by a second processor of a device for providing a first direction to a location and disabling a global positioning system (GPS) receiver on the device subsequent to providing the first direction. The instructions are also executable by the second processor for monitoring motion of the device based on input from a motion sensor on the device responsive to disabling the GPS receiver. The first processor transfers the instructions over a network via the network adapter.

The details of present principles, both as to their structure and operation, can best be understood in reference to the accompanying drawings, in which like reference numerals refer to like parts, and in which:

DETAILED DESCRIPTION

Figure 1:
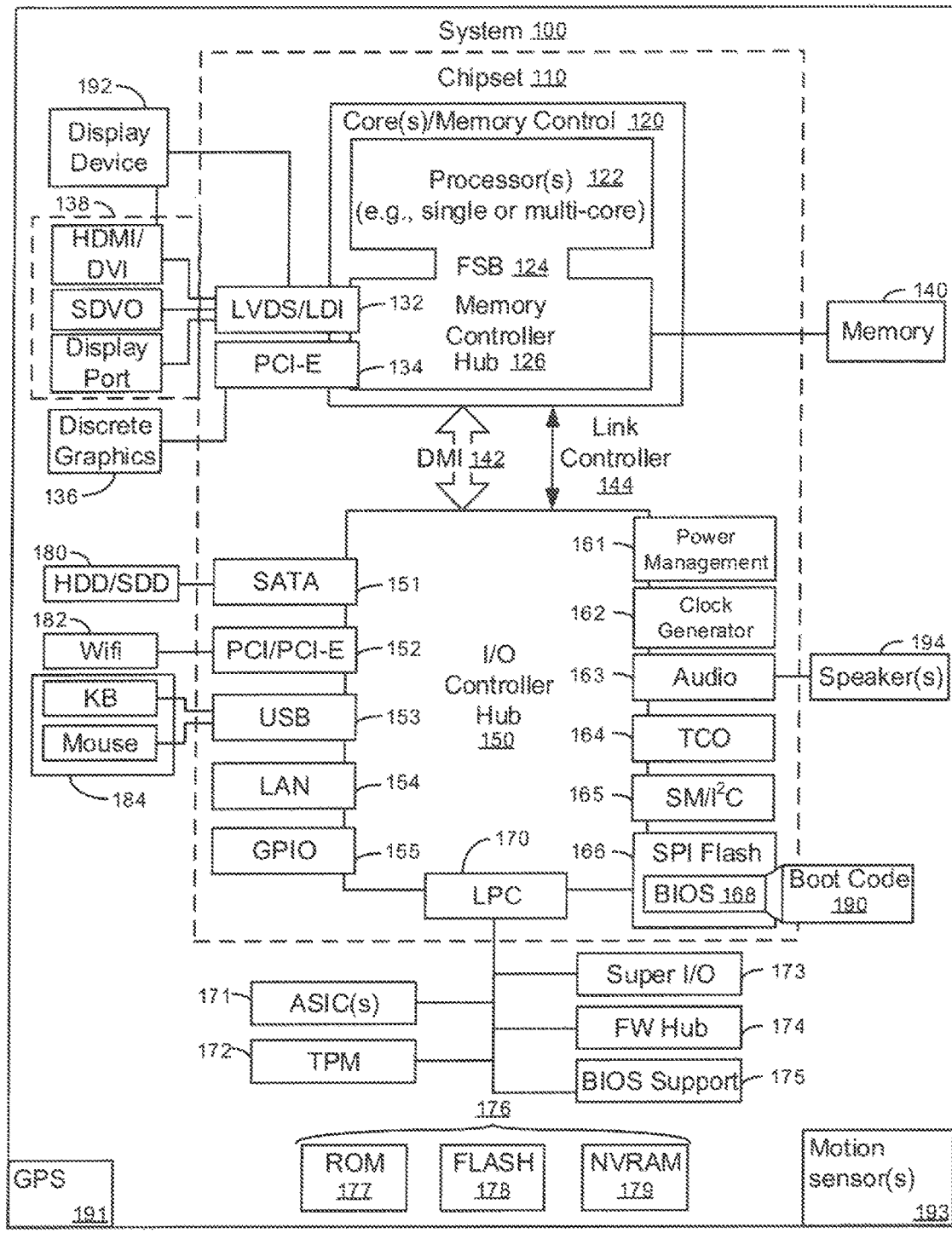
FIG. 1 is a block diagram of an example system in accordance with present principles.

With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet, computers, so-called convertible devices (e.g., having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilla or other browser program that can access web applications hosted by the internet servers over a network such as the Internet, a local intranet, or a virtual, private network.

As used herein, instructions refer to computer-implemented steps for processing information in the system. Instructions can be implemented in software, firmware or hardware; hence, illustrative components, blocks, modules, circuits, and steps are set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software and/or applications described by way of flow charts and/or user interfaces herein can include various sub-routines, procedures, etc. It is to be understood that logic divulged as being executed by, e.g., a module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (e.g., that may not be a transitory signal) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired, cables including fiber optics and coaxial wires and twisted pair wires. Such connections may include wireless communication connections including infrared and radio.

In an example, a processor can access information, over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data, through Its shift registers to output calculated data on output lines, for presentation, of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

"A system having one or more of A, B, and C" (likewise "a system having one or more of A, B, or C" and "a system having one or more of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown. Note that in some embodiments the system 100 may be a desktop computer system, such as one of the ThinkCentre® or ThinkPad® series of personal computers sold by Lenovo (US) Inc. of Morrisville, N.C., or a workstation computer, such as the LinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX® or Playstation®, and/or the system 100 may include a wireless telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller huh 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interlace for communication over at least one network such as the Internet, a WAN, a LAN, etc. under direction of the processor(s) 122), a general, purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interlace (SPI Flash) 166, which, in the example of FIG. 1, includes BIOS 168 and boot code 190. With respect to network connections, the I/O hub controller 150 may include integrated gigabit Ethernet controller lines multiplexed, with a PCI-E interface port. Other network features may operate independent, of a PCI-E interface.

The interfaces of the I/O hub controller 150 may provide for communication with various devices, networks, etc. For example, where used, the SATA interface 151 provides for reading, writing or reading and writing information, on one or more drives 180 such as HDDs, SDDs or a combination thereof, but in any case the drives 180 are understood to be, e.g., tangible computer readable storage mediums that may not be transitory signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 170 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verity that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system, memory 140). An operating system may be stored in any of a variety of locations and accessed, for example, according to instructions of the BIOS 168.

The system 100 may also include a GPS transceiver 191 that is configured to receive geographic position information from at least one satellite and provide the information to the processor 122. However, it is to be understood that another suitable position receiver other than a GPS receiver may be used in accordance with present principles to determine the location of the system 100.

Furthermore, the system 100 may include one or more motion sensors 193 such as a gyroscope that senses and/or measures orientation of the system 100 and provides input related thereto to the processor 122, an accelerometer that senses acceleration and/or movement of the system 100 and provides input related thereto to the processor 122, another inertial sensor that senses movement of the system 100 and provides input related thereto to the processor 122, a compass that senses a direction in which the system 100 is oriented and provides input related thereto to the processor 122, etc.

Additionally, though now shown for clarity, in some embodiments the system 100 may include an audio receiver/microphone that provides input to the processor 122 based on, e.g., a user providing audible input to the microphone, and a camera that gathers one or more images and provides input related thereto to the processor 122. The camera may be a thermal imaging camera, a digital camera such as a webcam, a three-dimensional (3D) camera, and/or a camera otherwise integrated into the system 100 and controllable by the processor 122 to gather pictures/images and/or video.

It is to be understood that an example client device or other machine/computer may include fewer or more features than shown on the system 100 of FIG. 1. In any case, it is to be understood at least based on the foregoing that the system 100 is configured to undertake present principles.

Figure 2:
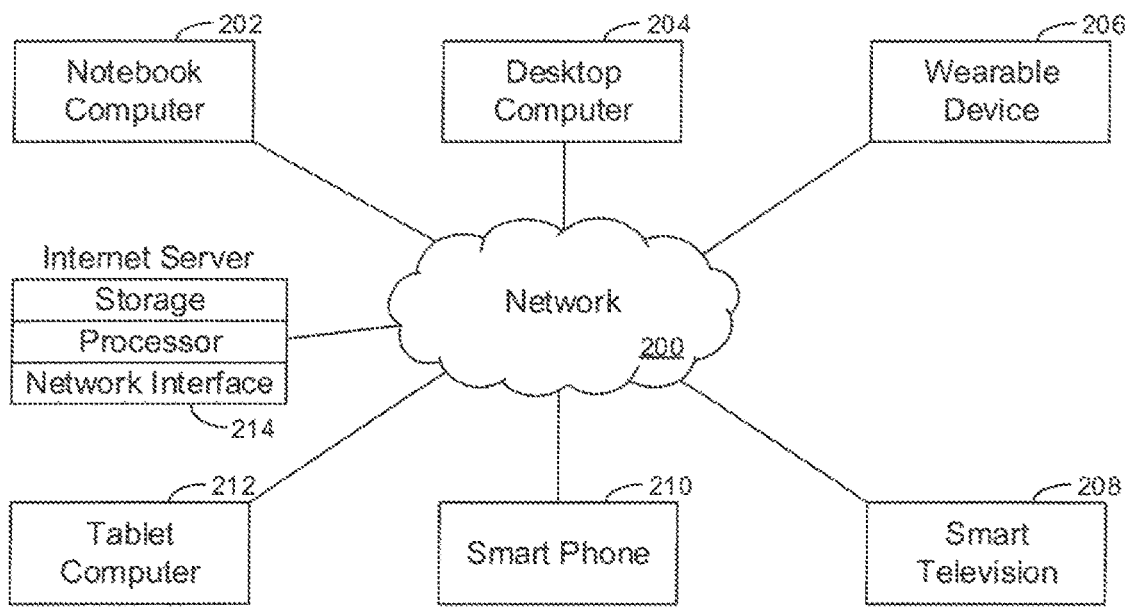
FIG. 2 is a block diagram of a network of devices in accordance with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 are configured to communicate with each other over the network 200 to undertake present principles.

Figure 3A:
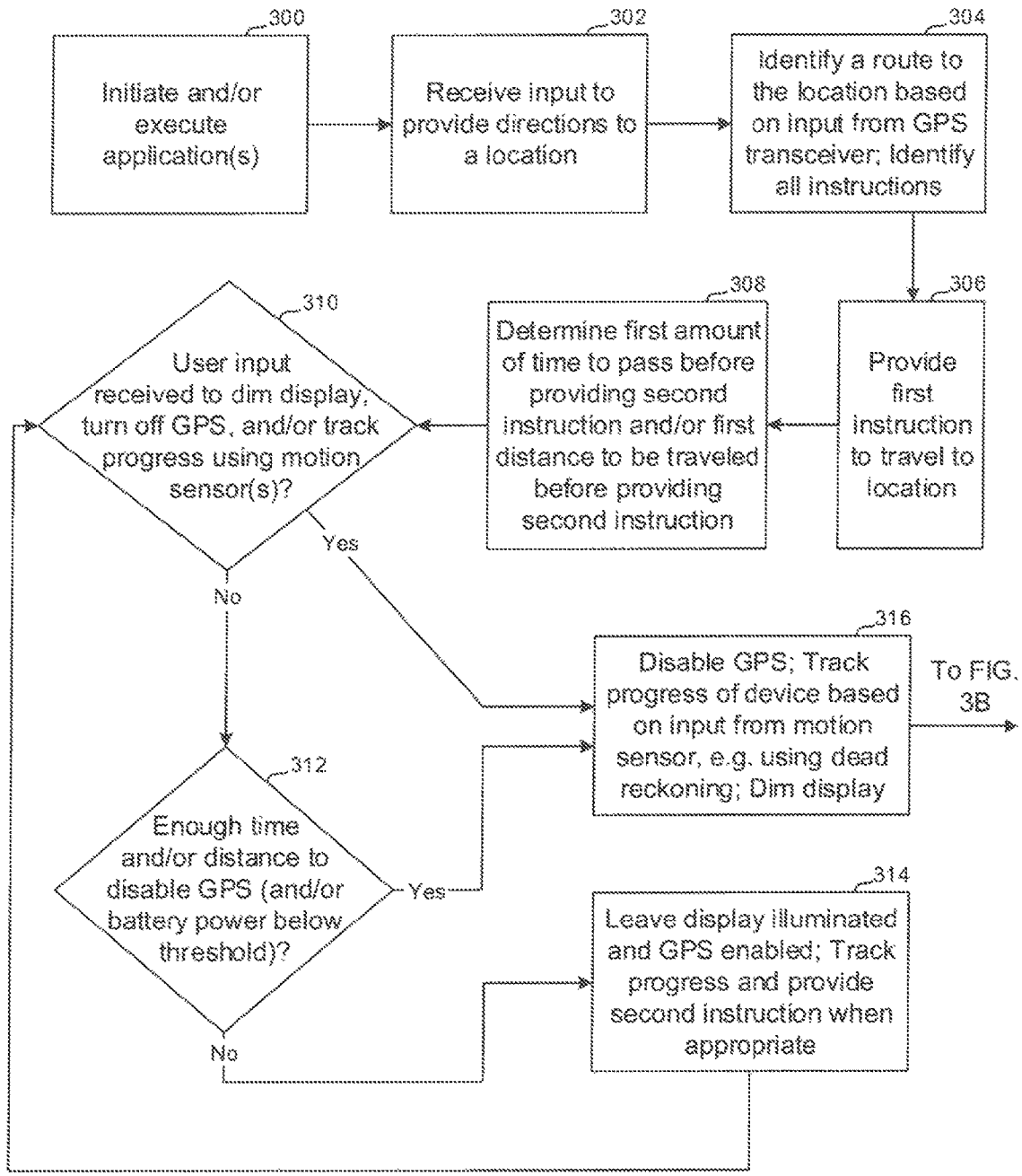
FIGS. 3A and 3B are flow charts showing an example algorithm in accordance with present principles.

Referring to FIG. 3A, it shows example logic that may be undertaken by a device such as the system 100 in accordance with present principles (referred to below as the "present device"). Beginning at block 300, the logic initiates and/or executes one or more applications stored on the present device for undertaking present principles, such as a maps application, a direction-providing application, a global positioning system (GPS) application, a motion tracking application, a compass application, etc. From block 300 the logic then moves to block 302, where the logic receives input to provide directions to a destination location, in some example embodiments, the input that is received at block 302 may include an address provided by the user of a destination to which the user wishes to travel, where the address was input to the present device via a virtual keyboard presented on the present device's display and/or was input via voice input.

After block 302 the logic proceeds to block 304. At block 304 the logic identifies a route to the location based at least in part on input from the present device's GPS transceiver. In some embodiments at block 304, all instructions may be identified that are to be provided using the present device to navigate the user along the route to the destination, while in other embodiments only a threshold amount of instructions and/or the next instruction to be provided are identified at block 304. In either case, the route and/or instructions may be identified by the present device by analyzing a map and/or map metadata to determine a fastest and/or most direct route via streets and highways from the present device's current location (as determined based on input from the GPS transceiver (e.g., of GPS coordinates)) to the destination location. In addition to or in lieu of the foregoing, the route and/or instructions may be identified by the present device by transmitting GPS coordinates of the current location, of the present device, as received from the present device's GPS transceiver, to a server over the Internet along with the location/destination address, and then receiving back from, the server route information and/or instructions to travel to the destination. Still other ways of identifying the route and/or instructions may be used in accordance with present principles as well.

After block 304 the logic then proceeds to block 306 where the logic provides a first instruction to travel to the location. The first instruction may be provided audibly such as via an automated voice presented through speakers on the present device, and/or the first instruction may be provided visually such, as via text and graphics presented on a display on the present device. After providing the first instruction at block 306, the logic then moves to block 308 where the logic determines a first amount of time that is to pass before a second instruction to travel to the location is to be provided, and/or determines a first distance to be traveled before the second instruction to travel to the location is to foe provided. The logic may do so at block 308 by respectively estimating and/or determining the time it will take to travel to a point where a next turn is to be made based on publically accessible road-related metadata such as a speed limit for the road being traveled prior to the next turn (to thus determine an amount of time by dividing the distance to the point by the speed limit on the road to get there), and/or estimating and/or determining the distance to the next point at which a turn is to be made based on a map and/or map metadata that is accessed to compare locations (current and destination) and determine a distance to be traveled via a street to the point where the next turn is to be made.

Still referring to FIG. 3A, from block 308 the logic proceeds to decision diamond 310. At diamond 310 the logic determines whether user input has been received to at least dim (e.g., dim or turn off) the present device's display, turn the present device's GPS transceiver off, and/or track process along the route using data from a motion senor. An affirmative determination causes the logic to proceed from diamond 310 to block 316, which will be described shortly.

However, first note that responsive to a negative determination at diamond 310, the logic proceeds to decision diamond 312 instead. At diamond 312 the logic determines whether there is enough time (e.g., at least a threshold amount of time) and/or enough distance (e.g., at least a threshold distance) to warrant disabling the present device's GPS transceiver. In one example, the determination at diamond 312 may be made, in the case of whether there is enough time, by ascertaining whether the first amount of time determined at block 308 is more or less than a threshold amount of time and determining that there is enough time to warrant disabling the GPS transceiver responsive to a determination that the first amount of time is more than the threshold amount of time. In another example, the determination at diamond 312 may be made, in the case of whether there is enough distance, by ascertaining whether the first distance determined at block 308 is more or less than a threshold distance and determining that there is enough distance to warrant disabling the GPS transceiver responsive to a determination that the first distance is more than the threshold distance.

Furthermore, in some example embodiments, the threshold amount of time and threshold distance may be correlated (e.g., based on specifications set by the present device's manufacturer) to a minimum amount of battery power that would be saved for a battery in the present device if the GPS transceiver was turned off for at least respectively, the threshold amount of time or threshold distance. Otherwise, if the GPS transceiver is to be powered back up before the threshold amount of time and/or threshold distance is reached in order to use the GPS transceiver to provide the next instruction to the destination, more power and calibration time may ultimately be consumed in doing so than had the GPS transceiver remained enabled for the duration/distance.

In any case, and still in reference to diamond 312, note that the determination made thereat may additionally include a determination of whether available battery power for the battery in the present device is below a threshold amount (e.g., threshold percent remaining) so that, if desired, the GPS transceiver may not be disabled even if enough time and/or distance exists to warrant doing so unless battery available battery power drops below the threshold amount.

A negative determination at diamond 312 causes the logic to proceed to block 314, where the logic continues to control the display to remain illuminated and/or continues to control the GPS transceiver to remain enabled. Travel progress toward the destination location along the route may continue to be tracked based on input from the GPS transceiver until a second instruction is to be provided at block 314 as well. From block 314 the logic may then revert to diamond 310 and proceed therefrom.

However, note that an affirmative determination at diamond 312 instead causes the logic to proceed, to block 316, which may also be arrived at responsive to an affirmative determination at diamond 310 as discussed above. At block 316 the logic disables (e.g., ceases providing power to and/or ceases sending control signals to) the present device's GPS transceiver and begins tracking travel progress of the device based on input from a motion sensor. For instance, travel, progress may be tracked by performing dead reckoning and/or inertial navigation calculations based on input from the motion sensor(s) (e.g., a gyroscope and accelerometer on the present device) to estimate, based on speed values, acceleration values, and direction values from the motion sensor, GPS coordinates for the present device's current location and/or a distance traveled and in what directions) over a given period of time. This data related to distance and direction(s) estimated to be traveled over the given period of time based on input from the motion sensor may then be compared against map data (e.g., for distances and directions to be traveled along the route to the location) to estimate where the present device is along the route that is to be traveled.

Figure 3B:
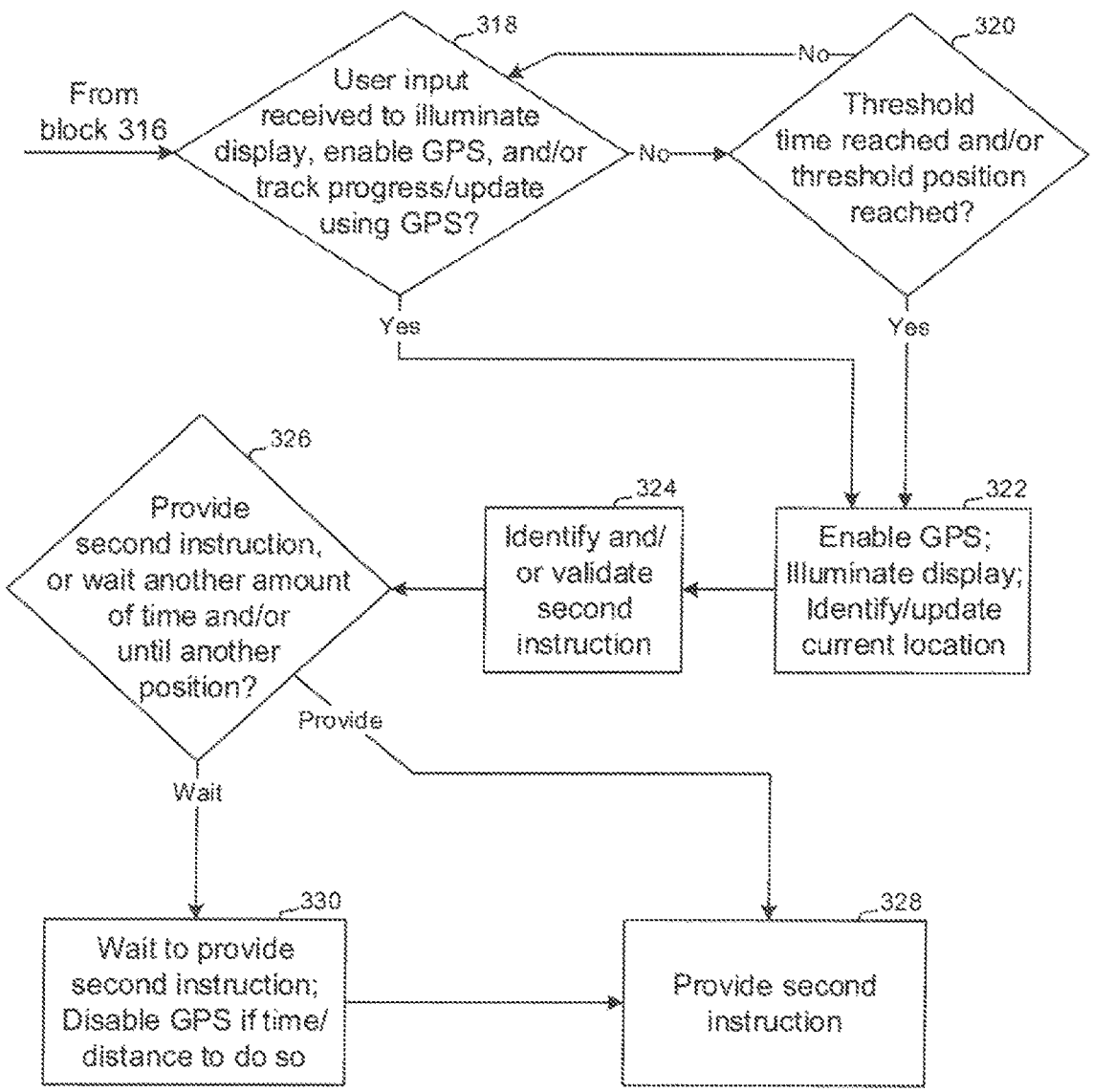

Before moving on to the description of FIG. 3B, note that also at block 316, the logic may at least dim the present device's display while the GPS transceiver is disabled, if desired. But regardless, note that from block 316 the logic proceeds to decision diamond 318 of FIG. 3B.

At diamond 318 of FIG. 3B, the logic determines whether any user input has been received to illuminate the display, enable the GPS transceiver, and/or track progress or update position information for the present device using input from the GPS transceiver. An affirmative determination at diamond 318 causes the logic to proceed to block 322, which will be described shortly.

However, first note that a negative determination at diamond 318 causes the logic to proceed to decision diamond 320. At diamond 320 the logic determines whether a threshold time and/or a threshold position has been reached. In some example embodiments, the threshold time and/or threshold position may be, respectively, a predetermined time prior to the time/place at which the next instruction to follow the route is to be provided and a predetermined distance prior to the time/place at which the next instruction is to be provided. The predetermined times and/or distances may be based on, e.g., a minimum amount of time that the GPS transceiver may take to power on and determine (based on input therefrom) a current location of the device and/or when to provide the next instruction. Notwithstanding, the threshold time and/or position may also or instead be established based on user-specified (and/or manufacturer-specified) desired times and/or positions/distances traveled at which the present device's current location is to be identified and/or updated using data from the GPS transceiver.

Regardless, note that a negative determination at diamond 320 causes the logic to proceed back to diamond 318 and proceed therefrom. However, an affirmative determination at diamond 320 instead causes the logic to proceed to block 322, which may also be arrived at responsive to an affirmative determination at diamond 318 as described above. In any case, at block 322 the logic enables the present device's GPS transceiver and optionally illuminates the display if it was previously dimmed or powered off. Also at block 322, the logic may receive input from the GPS transceiver once it is powered on and operational to identity and/or update the current location of the present device.

Furthermore, in some embodiments, this identification and/or update using the GPS transceiver may be accelerated owing to the current position being continuously and/or periodically estimated using data from the motion sensor while the GPS transceiver was disabled. Thus, the current actual position of the device may be more quickly determined using GPS and/or map data with the current estimated position being used as a frame of reference from which to identify the current actual position.

Also in some embodiments, this identification and/or update may be performed using the GPS transceiver while the present device transmits (e.g., over the Internet) the current estimated, position to a server with which the present device is communicating to relatively quickly ascertain, based on data from the server, when and where to provide the next instruction to the user, along with what information to include in the instruction, based on the current estimated position. This may later be verified using the current actual position as later determined based on input from the GPS transceiver once powered back on and again providing GPS data. Still, further, while verifying the current actual position using the GPS transceiver, in some embodiments the current estimated position may be used to indicate to a user where along a route the present device is currently located (e.g., by presenting a graphic on the present device's display representing the route, along with an indication of current position) so that the user does not have to wait for GPS verification when attempting to ascertain, at least approximately, the present device's current position.

However, regardless of whether identified based on the current estimated position, the current actual position as determined based on GPS transceiver input, or previously received information (e.g., such as at block 304 where all instructions to the destination may have been provided), the second and/or next instruction may be identified, confirmed, and/or validated at block 324, along with information pertaining to when and where to provide it (e.g., based on map data accessible to the present device and/or information received from a server).

From block 324 the logic then proceeds to decision diamond 326. At diamond 326 the logic determines whether to provide the next (in this case, second) instruction (e.g., immediately) or to wait another amount of time and/or until another position is reached by the present device. The determination at diamond 326 may be one similar to the determination made at diamond 312 as described above, otherwise based a determination of whether there is enough time and/or distance to be traveled to warrant disabling the GPS transceiver, and/or based on a determination that some other amount of time should transpire before providing the second instruction even if the GPS transceiver is not disabled again. A determination at diamond 326 to provide the second instruction causes the logic to proceed to block 328, where the logic provides the second instruction at the present device (e.g., audibly and/or visually outputs the second instruction).

However, a determination at diamond 326 to wait (e.g., for another amount of time, until a later time, until another position has been arrived at, and/or until another distance has been traveled) causes the logic to instead move to block 330. At block 330 the logic waits to provide the second instruction and, if applicable, disables the present device's GPS transceiver until such time as the logic is to move from block 330 to block 328 and provide the second instruction. Note that whether arrived at from diamond 326 or block 330, after providing the instruction at block 328 the logic may end or revert back to, e.g., block 308 and proceed therefrom to provide a third instruction to travel the route to the destination location.

Figure 4:
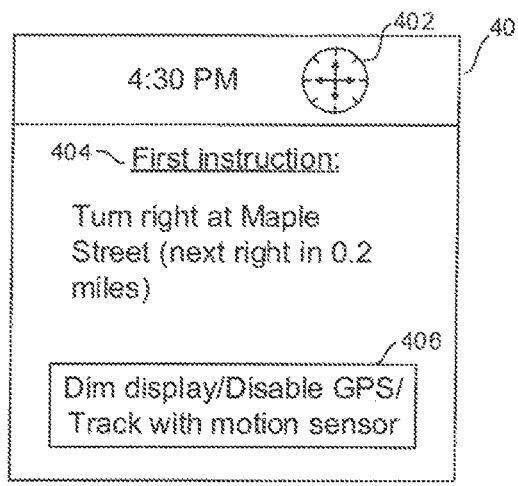
FIGS. 4-6 are example user interfaces (UIs) in accordance with present principles.

Continuing now in reference to FIG. 4, an example user interface (UI) 400 presentable on the display of a device in accordance with present principles is shown. The UI 400 includes an indication 402 (which in this example is an icon of a compass) that travel of the device is being tracked using the device's GPS transceiver. A first instruction 404 is also provided visually on the UI 400, along with a selector 406 selectable by a user to automatically without further user input cause the device to do one or more of dim and/or turn off the device's display, disable the GPS transceiver, and/or track travel using input from the device's motion sensor.

Figure 5:
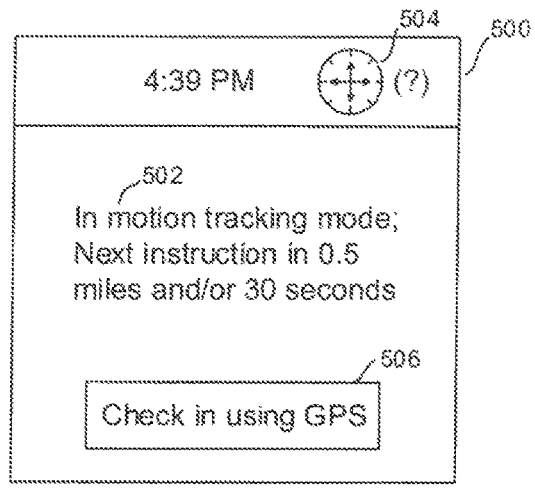

FIG. 5 thus shows a UI 500 that may be presented responsive to selection of the selector 406. The UI 500 includes an indication 502 that the device is tracking travel using device motion (e.g., rather than input from a GPS transceiver) as determined based on input from the motion sensor. The UI 500 also includes an indication 504 different from the indication 402 (which in this example is an icon of a compass with a question mark in parenthesis adjacent thereto) that travel of the device is being estimated using input from the motion sensor. Furthermore, the UI 500 may also include a selector 506 selectable to automatically without further user input cause the device to enable the device's GPS transceiver and identify and/or confirm the device's current location using input from the GPS transceiver.

Figure 6:
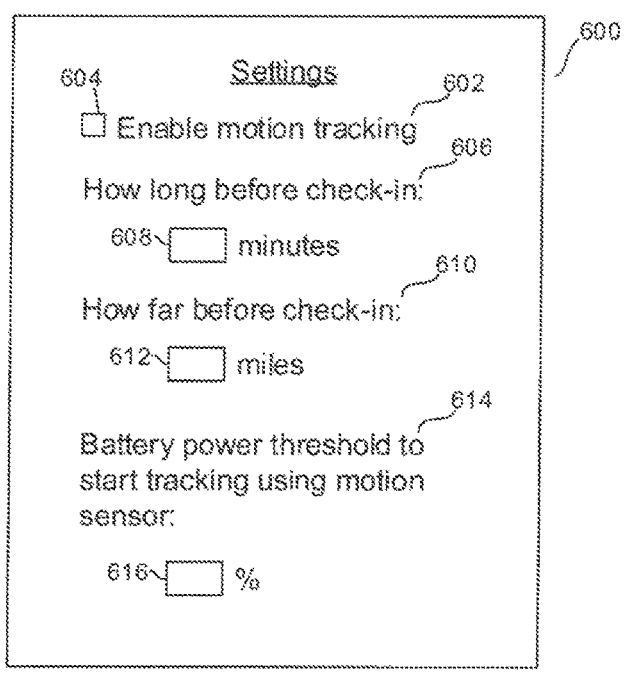

Moving on, reference is now made to FIG. 6. FIG. 6 shows an example settings UI 600 that may be presented on a display of a device for configuring the device to undertake present principles. A first option 602 is shown to enable motion tracking, where appropriate as set forth herein, using input from a motion sensor while also disabling a GPS transceiver on the device. The first option 602 is selectable using the cheek box 604.

The UI 600 also includes an option 606 for a user to provide numerical input to box 608 to set a maximum amount of time that may pass with the GPS transceiver disabled before the device is to enable it and confirm the device's current location using input from the GPS transceiver. Also shown on the UI 600 is an option 610 for a user to provide numerical input to box 612 to set a maximum distance that may be traveled with the GPS transceiver disabled before the device is to enable it and confirm the device's current location using input from the GPS transceiver.

Still further, the UI 600 of FIG. 6 may include an option 614 for a user to provide numerical input to box 616 to set a battery power threshold at which the device is to begin tracking travel using input from the device's motion sensor (e.g., as opposed to keeping the GPS transceiver enabled the entire time instructions are being provided). Note that if numerical input were not entered by a user to box 608, 612, or 616, or if deleted therefrom, the respective option associated with that box would not be enabled.

Before concluding, but still in accordance with present principles, it is to be understood that direction providing software, applications, and/or algorithms maybe used to undertake present principles. Furthermore, such an application and/or software may remain enabled, executing, and/or on during the steps described above in reference to FIGS. 3A and 3B so that, e.g., a maps application remains on and/or active to track device progress along a route even if doing so using input from a motion sensor. The maps application may then also be used to update the current actual position of the device based on input from the GPS transceiver.

Also before concluding, it is to be understood that although a software application for undertaking present principles may be vended with a device such as the system 100, present principles apply in instances where such an application is downloaded from a server to a device over a network such as the Internet. Furthermore, present principles apply in instances where such an application is included on a computer readable storage medium that is being vended and/or provided, where the computer readable storage medium is not a transitory signal and/or a signal per se.

While the particular DISABLEMENT OF GLOBAL POSITIONING SYSTEM TRANSCEIVER WHILE PRO- VIDING DIRECTIONS is herein shown and described in detail, it is to be understood that the subject matter which is encompassed by the present application is limited only by the claims.

What is claimed is:

1. A device, comprising:
a processor;
a global positioning system (GPS) transceiver accessible to the processor;
a motion sensor accessible to the processor; and
storage accessible to the processor and bearing instructions executable by the processor to:
identify a route to a location based at least in part on input from the GPS transceiver;
determine whether to disable the GPS transceiver based at least in part on an amount of remaining power of a battery in the device;
disable the GPS transceiver responsive to a determination to disable the GPS transceiver; and
track travel progress along the route based at least in part on input from the motion sensor at least until one or more of a threshold time before conclusion of a first amount of time that is to pass before an instruction to travel to the location is to be provided, and a threshold position before an end point of a first distance that is to be traveled before the instruction is to be provided.

2. The device of claim 1, wherein the instructions are executable by the processor to:
determine one or more of the first amount of time that is to pass before the instruction to travel to the location is to be provided and the first distance that is to be traveled before the instruction is to be provided.

3. The device of claim 1, wherein the instructions are executable by the processor to:
responsive to one or more of the threshold time being reached and the threshold position being reached, enable the GPS transceiver and validate, based at least in part on input from the GPS transceiver, that the instruction is a next instruction to be provided.

4. The device of claim 1, wherein the instructions are executable by the processor to:
responsive to one or more of the threshold time being reached and the threshold position being reached, enable the GPS transceiver and identify the instruction based at least in part on input from the GPS transceiver.

5. The device of claim 1, wherein the instructions are executable by the processor to:
responsive to one or more of the threshold time being reached and the threshold position being reached, enable the GPS transceiver and wait to provide the instruction until when the instruction is to be provided as identified based at least in part on input from the GPS transceiver.

6. The device of claim 1, wherein the instructions are executable by the processor to:
responsive to one or more of the threshold time being reached and the threshold position being reached, enable the GPS transceiver and identify, based at least in part on input from the GPS transceiver, a current location of the device.

7. The device of claim 6, wherein the instructions are executable by the processor to:
responsive to the identification of the current location, determine at least based in part on the current location whether to provide the instruction.

8. The device of claim 1, wherein the instructions are executable by the processor to:
responsive to one or more of the threshold time being reached and the threshold position being reached, enable the GPS transceiver and determine, based at least in part on input from the GPS transceiver, one or more of that at least a second amount of time is to pass before the instruction is to be provided and that there is at least a second distance that is to be traveled before the instruction is to be provided; and
responsive to the determination one or more of that at least the second amount of time is to pass and that there is at least the second distance that is to be traveled, disable the GPS transceiver.

9. The device of claim 1, comprising a display accessible to the processor, and wherein the instructions are executable by the processor to:
at least dim the display while tracking travel progress along the route based on input from the motion sensor.

10. The device of claim 2, wherein the instructions are executable by the processor to:
determine at least the first amount of time that is to pass before the instruction is to be provided.

11. The device of claim 2, wherein the instructions are executable by the processor to:
determine at least the first distance to be traveled before the instruction is to be provided.

12. The device of claim 1, wherein the instructions are executable by the processor to:
track travel progress along the route based at least in part on input from the motion sensor at least until the threshold time.

13. The device of claim 1, wherein the instructions are executable by the processor to:
track travel progress along the route based at least in part on input from the motion sensor at least until the threshold position is reached.

14. The device of claim 1, wherein the instructions are executable by the processor to:
track travel progress along the route at least in part by performing inertial navigation calculations based on input from the motion sensor.

15. The device of claim 1, comprising a display accessible to the processor, and wherein the GPS transceiver is disabled responsive to receipt of user input to at least dim the display.

16. A method, comprising:
identifying, using a device, at least a first instruction to travel to a location; and
determining whether to disable a global positioning system (GPS) transceiver on the device based at least in part on an amount of remaining power of a battery in the device and based at least in part on one or more of a distance to be traveled before a second instruction is provided and a length of time to pass before the second instruction is provided; and
disabling the GPS transceiver responsive to determining to disable the GPS transceiver.

17. An apparatus, comprising:
a first processor;
a network adapter; and
storage bearing instructions executable by a second processor of a device for:
providing a first direction to a location;
determining whether to disable a global positioning system (GPS) receiver on the device based at least in part on an amount of remaining power of a battery coupled to the device;

disabling, responsive to determining to disable the GPS receiver, the receiver subsequent to providing the first direction; and responsive to disabling the GPS receiver, monitoring motion of the device based on input from a motion sensor on the device;

wherein the first processor transfers the instructions over a network via the network adapter.

18. The apparatus of claim 17, wherein the instructions are executable by the second processor for:

disabling the GPS receiver responsive to one or more of user input and a determination that at least a threshold amount of time exists before a second direction to the location is to be provided.

19. The apparatus of claim 17, wherein the instructions are executable by the second processor for:

enabling the GPS receiver responsive to one or more of user input and a determination that at least a threshold amount of time has passed.

20. The method of claim 16, wherein disabling the GPS transceiver comprises one or more of: ceasing to provide power to the GPS transceiver, ceasing to send control signals to the GPS transceiver.

* * * * *